137-454.2
4/28/87 Y5 RE 32,409

United States Patent [19]

Holtgraver

[11] E Patent Number: Re. 32,409

[45] Reissued Date of Patent: Apr. 28, 1987

[54] VALVE ASSEMBLY

[75] Inventor: Edward G. Holtgraver, Spring, Tex.

[73] Assignee: Keystone International, Inc., Houston, Tex.

[21] Appl. No.: 767,525

[22] Filed: Aug. 19, 1985

Related U.S. Patent Documents

Reissue of:

[64] Patent No.: 4,399,833
Issued: Aug. 23, 1983
Appl. No.: 345,660
Filed: Feb. 4, 1982

[51] Int. Cl.[4] ..... F16K 51/00

[52] U.S. Cl. ..... 137/315; 137/454.2; 251/305

[58] Field of Search ..... 137/315, 454.2; 251/148, 152, 304, 305, 306, 359, 361; 285/363

[56] References Cited

U.S. PATENT DOCUMENTS

| | | | |
|---|---|---|---|
| 2,756,017 | 7/1956 | Silverman | 251/148 |
| 2,922,666 | 1/1960 | Lange et al. | 285/363 |
| 3,143,132 | 8/1964 | Pangburn | 137/454.2 |
| 3,531,082 | 9/1970 | Scaramucci | 251/151 |
| 3,675,893 | 7/1972 | Avelines | 137/315 |
| 3,677,514 | 7/1972 | Mencarelli | 251/148 |
| 3,722,855 | 3/1973 | Massey | 251/151 |
| 3,743,242 | 7/1973 | Scaramucci | 137/454.2 |
| 3,781,043 | 12/1973 | Hagmann | 285/363 |
| 3,981,482 | 9/1976 | Callahan, Jr. et al. | 251/152 |
| 3,989,285 | 11/1976 | Yancey | 285/363 |
| 4,079,746 | 3/1978 | Killian | 137/315 |
| 4,079,746 | 3/1978 | Killian | 137/315 |
| 4,101,112 | 7/1978 | Conners et al. | 251/148 |
| 4,103,866 | 8/1977 | Robinson | 251/152 |
| 4,272,054 | 6/1981 | Zinnai | 251/306 |
| 4,281,818 | 8/1981 | Cunningham et al. | 251/307 |
| 4,289,297 | 9/1981 | Nakanishi | 251/306 |

FOREIGN PATENT DOCUMENTS

| | | |
|---|---|---|
| 2825503 | 12/1979 | Fed. Rep. of Germany . |
| 2808280 | 7/1980 | Fed. Rep. of Germany . |
| 2916926 | 10/1980 | Fed. Rep. of Germany . |
| 1405407 | 9/1975 | United Kingdom . |

*Primary Examiner*—Martin P. Schwadron
*Assistant Examiner*—Sheri M. Novack
*Attorney, Agent, or Firm*—Browning, Bushman, Zamecki & Anderson

[57] ABSTRACT

A wafer-type valve for securing between two flange fittings comprises a valve body having a flowway therethrough, connection formations integrally adjoining the valve body and extending radially therefrom, a valve element mounted in the flowway, and adapter means adjoining the valve body and extending outwardly therefrom. First longitudinally extending connectors cooperate between the connection formations of the valve body and the adapters to connect the adapters to the valve body, while second longitudinally extending connectors cooperate between the adapters and the flanges of the flange fittings to connect the adapters to the flange fittings. The valve also includes a seat lining its flowway and a seat retainer axially abutting the seat and one end of the valve body. The adapter overlaps the seat retainer so as to mount it to the valve body.

17 Claims, 5 Drawing Figures

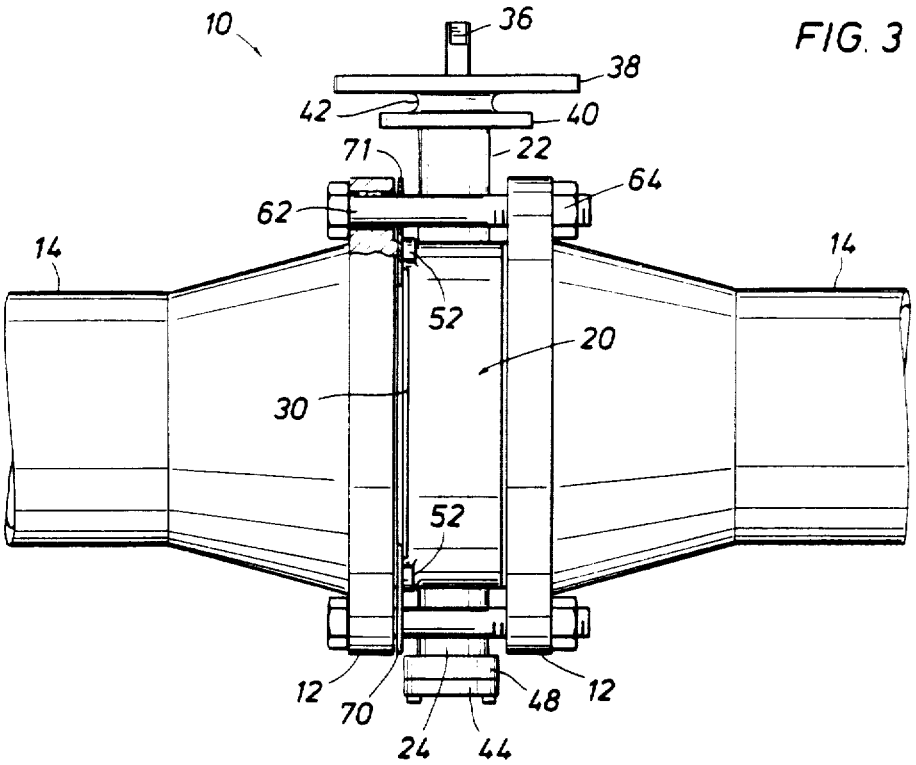
FIG. 3
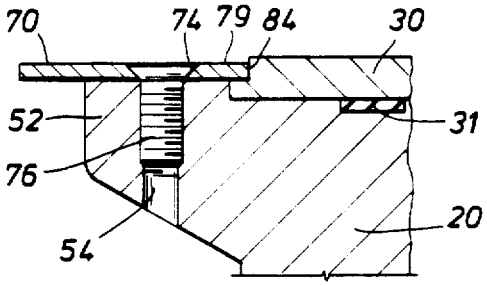
FIG. 4
FIG. 5
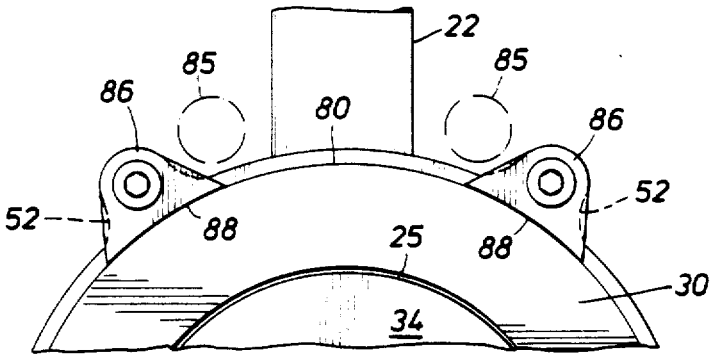

VALVE ASSEMBLY

Matter enclosed in heavy brackets [ ] appears in the original patent but forms no part of this reissue specification; matter printed in italics indicates the additions made by reissue.cl

BACKGROUND OF THE INVENTION

1. Field of the Invention

The present invention pertains to wafer-type valves, such as butterfly valves. Such valves typically include a relatively thin, generally cylindrical valve body which is connected to a pipeline by being clamped between two flange fittings. The valve body has a flowway therethrough and a valve element, generally disc-shaped, which is mounted in the flowway for movement from a closed valve position to an open valve position. The present invention comprises an adapter device for adapting the valve body to various types of flange fittings in a pipeline. Furthermore, the valve body includes an annular seat located between the disc-shaped valve element and the valve body. This seat is held in place by a seat retainer plate. This invention also pertains to mounting of this seat retainer in position on the valve body.

2. Description of the Prior Art

In the past, some wafer valves of the type described above have had holes formed in their valve bodies for receipt of stud members such as bolts which extend between the flange fittings in order to clamp the valve therebetween. The placement of the studs through the holes in the valve body serves to center the valve in place until the flange fittings can be firmly secured.

Problems arise in that the various flange fittings with which a particular type of valve will be used are not uniform. In particular, the size, number, and spacing of the stud members vary. In the past, it has been necessary to manufacture valves of one basic type in a number of forms each designed to be used with a particular type of flange fitting. The manufacture of various forms of a single type of valve body is not only unduly expensive, but still fails, in at least some cases, to ensure that all the types of flange fittings which may be encountered in the field can be properly accommodated.

A number of attempts have been made in the past to accommodate the various types of flange fittings without changing the form of the valve body. One such technique has been to cast lugs onto the valve body in correspondence with individual bolt pattern of the flange fitting with which that valve is to be used. Another solution has been to cast a flanged connection area onto the valve body and drill holes to accommodate the specific flange requirements. None of these solutions offer the advantages and flexibility of the present invention. In each of these above-mentioned solutions, the valve body, once adapted by casting and/or drilling of appendages, is suitable for one flange standard only. None of these solutions make one given valve body compatible with the various International Flange Standards.

There are three U.S. patents which disclose means for adapting a standard valve body to various flange fittings. U.S. Pat. No. 4,079,746 shows a valve assembly in which the adapter has a generally circular central area which has a central opening for the non-interfering receipt of the rotary valve stem extending from the valve body. As distinguished from the present invention, this device is adapted for valve bodies having no integral formations with bolt-receiving holes. While suitable for this type of valve, the device of the U.S. Pat. No. 4,079,746 patent is more bulky, complex in configuration and cumbersome than is necessary or desirable for valves whose bodies form their own bolt holes.

U.S. Pat. No. 3,722,855 discloses a between-flange valve assembly and clamping assembly. In this device, the flanges are interchangeable so that any given valve structure can have various flanges on different ends. The flanges are internally threaded union members for engaging threaded pipes and other fittings. Interchangeable clamps lock around the flanges.

U.S. Pat. No. 4,101,112 also discloses a pipeline coupling system. This patent discloses reusable clamps between a wafer-type butterfly valve assembly and pipe flanges. Like the devices of the two prior patents, this device involves an adapter which is unduly complex for certain types of valve bodies.

SUMMARY OF THE INVENTION

The present invention comprises a wafer-type valve assembly for securing between two flange fittings of the type described hereinabove. The valve body has integral connection formations extending generally radially therefrom. Adapter means adjoin the valve body and extend outwardly therefrom. First longitudinally extending connector means are cooperative between the connection formations on the valve body and the adapter means to connect the adapter means to the valve body, and second longitudinally extending connector means are cooperative between the adapter means and the flanges of the flange fittings to connect the adapter means to the flange fittings.

Because both the first and second connector means are longitudinally directed, and more specifically comprise mating pin and socket means, with some of the sockets being defined by pre-formed holes in the valve body connection formations and the flanges, and others of the sockets being pre-formed holes in the adapter means, the latter can be formed as one or more relatively simple, inexpensive plate-like members. Such members are not only compact, but are particularly easy, and therefore, inexpensive to manufacture.

Additionally, the adapter means may serve the further function of mounting a valve seat retainer to the valve body in a particularly advantageous manner. As is known in the art, a valve seat typically lines the flowway of the valve body to provide a fluid-tight seal with the valve element when the latter is in its closed position. The seat retainer may be an annular plate-like member which abuts one axial end of the valve body as well as the valve seat itself. The adapter means of the invention may overlap this seat retainer so that, when the adapter itself is connected to the connection formations on the valve body, it in turn mounts the seat retainer to the valve body. As mentioned, both the seat retainer and the adapter means may be plates or plate-like members. The seat retainer is preferably undercut to receive the overlapping portion of the adapter means. Screws or other members of the first connector means, which attach the adapter plate to the connection formations of the valve body, may have their heads recessed into the adapter plate so that they do not protrude and interfere with proper abutment of the valve and the flange fitting. This helps to insure a firm, fluid-tight fit against the flange fitting. At the same time, this preferred method of mounting the seat retainer on the valve body eliminates the need for pins, bolts, or the like passing directly through the seat retainer, and this in turn facilitates the use of preferred types of gaskets adjacent the seat retainer.

It can be seen that the adapter means itself is easily removed from the valve body and replaced. In this manner, a standard form of valve body can be adapted to be used with many different types of flange fittings by simply changing the adapter means. The bores in the adapter means which form a portion of the first connector means for connecting the adapter means to the valve body will be in the same location in various interchangeable adapter means, while the bores which cooperate with the flange fittings to form the second connector means will be placed in different locations depending upon the type of flange fitting with which the particular adapter means is to be used.

Accordingly, it is an object of the present invention to provide improved means for making one valve body style compatible with the various types of flange fittings.

It is a further object of the present invention to provide an inexpensive and easy-to-manufacture means for locking the seat retaining plate of such a valve into position while providing adaptability between the various flange sizes or types.

Other objects, features and advantages of the invention will be made apparent from the following description of the preferred embodiments, the drawings, and the claims.

BRIEF DESCRIPTION OF THE DRAWINGS

FIG. 3 is a side elevational view of the assembled apparatus of FIG. 2 showing the valve as located between the flange fittings.

FIG. 4 is a detailed sectional view taken along line 4—4 of FIG. 1.

FIG. 5 is a side elevational view of an alternative embodiment.

DESCRIPTION OF THE PREFERRED EMBODIMENTS

Figure 1:
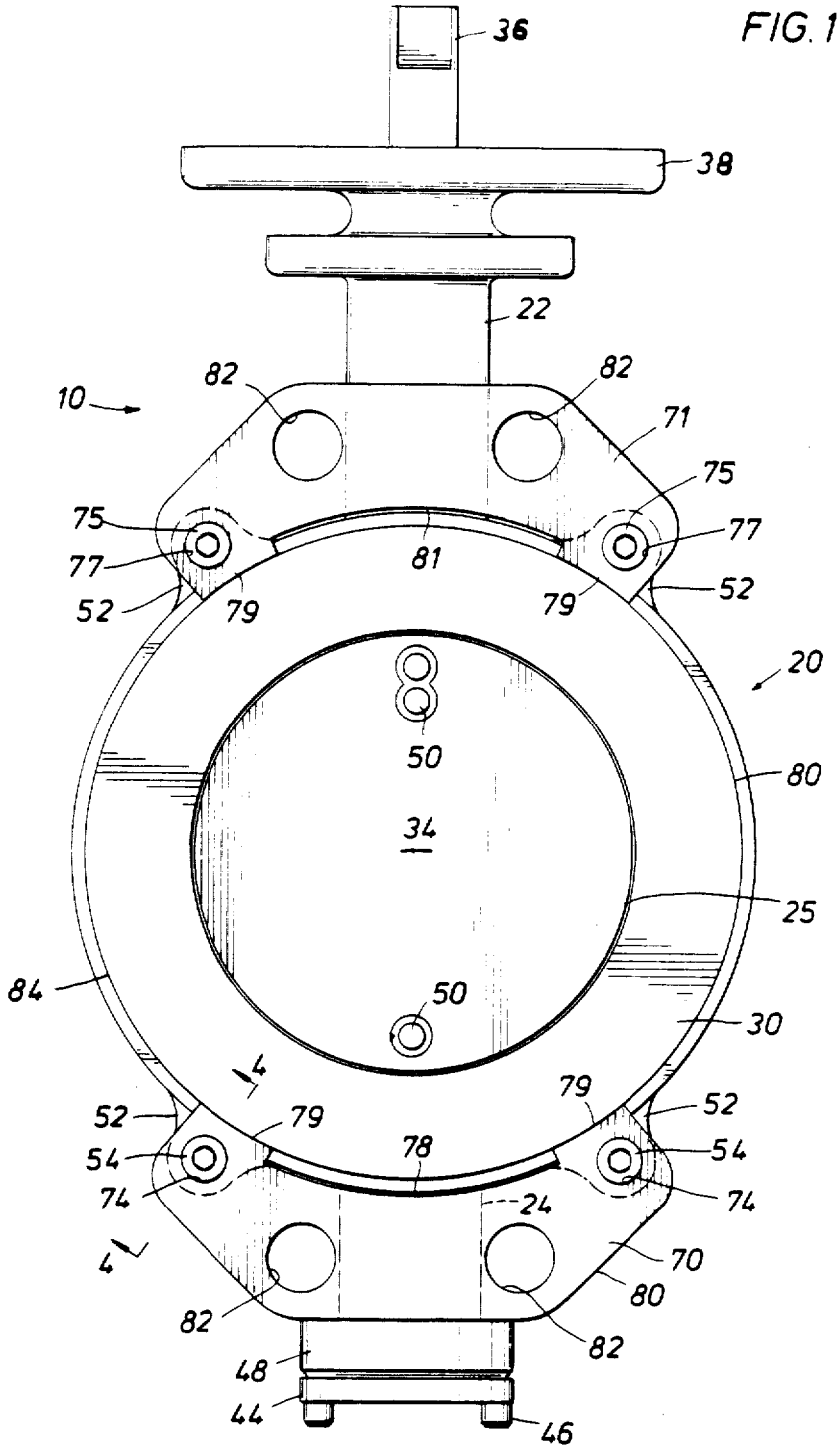
FIG. 1 is an end elevational view of an assembled butterfly valve in accord with the present invention.

Referring now to FIGS. 1–4, there is shown a wafer-type valve assembly generally indicated by the numeral 10. Valve assembly 10 is held in place in a pipeline by being clamped between flange fittings each comprised of an annular radially extending flange 12 formed or otherwise suitably affixed on the end of pipe 14. Each of the flanges 12 and its connected pipe 14 form a respective flow passageway 16.

The valve assembly 10 includes a valve body 20 having a cylindrical main portion 21 and upper and lower peripheral portions or bosses, 22 and 24, respectively, extending generally radially from main portion 21. A generally cylindrical valve seat 25 is disposed in the main portion 21 of the valve body and defines a flowway 26 through the valve body. As used herein, terms such as "longitudinally," "axially," "circumferentially," and "radially" will be used with reference to flowway 26 unless otherwise indicated. The main portion 21 of the valve body also includes a seat retaining plate 30 and a gasket 31. Seat retaining plate 30 is a generally annular member which abuts one end face of the valve body concentric with flowway 26. The seat retaining plate 30 also abuts seat 25 to locate it in its proper position. Gasket 31 is interposed between seat retaining plate 30 and valve body 20. Gasket 31, which has been illustrated somewhat diagrammatically, may be disposed in an axial recess in the valve body 20 as shown. For reasons to be developed more fully below, and specifically, because the use of the adapter plate 70 (to be described hereinafter) eliminates the need for screws or other connectors to pass through plate 30 and its gasket 31, any preferred type of gasket could be safely employed. The assembly can even be adapted to use a spiral wound metal gasket.

Valve assembly 10 further comprises a disc-like valve element 34 rotatably mounted in the flowway 26 for rotation about an axis which extends diametrically across the flowway, specifically through the center lines of the upper and lower bosses 22 and 24 of the valve body. In particular, the valve element 34 has upper and lower trunnions (not shown) extending radially therefrom into respective ones of the bosses 22 and 24 of the valve body and mounted rotatably therein. The valve assembly 10 also includes a valve stem 36 which is attached to valve element 34 and extends through the upper boss 22. The outer end of the valve stem 36 can thus be engaged by suitable actuator means or by a hand-operated handle or the like so as to rotate the valve element 34 between a closed valve position, as shown in FIG. 1, in which it extends transversely across the flowway 26 and an open valve position in which it extends generally along the flowway axis. In this latter position, the valve element 34 extends axially beyond the end faces of the main portion 20 of the valve body. Thus, the flowway 26 must be in substantial register with the flow passageways 16 to prevent the valve element 34 from jamming against the flanges 12 when moved from its closed valve position to its open valve position.

The upper boss 22 of the valve body has an annular flange 38 at its outer end extending radially with respect to the axis of rotation of valve element 30. The lower boss 24 acts as a receptacle for the lower valve stem. Lower boss 24 can contain a disc locator assembly, a pin receptacle or any other apparatus that will permit the rotation of the valve element 34 within valve body 20. A removable end piece 44 is attached to this lower boss 24. Bolts or screws 46 connect this end piece 44 with an attachment portion 48 of the lower boss. The removal of end piece 44, along with the assembly contained therein, permits the removal, or replacement, of disc 34 within valve body 20. Disc pins 50 serve to fix the valve element to the valve stem, and maintain these elements in their proper relative positions.

Extending radially outwardly and circumferentially spaced along the outer peripheral surface of valve body 20 are lugs 52. These lugs are formed or otherwise suitably integrally affixed along the outer diameter of valve body 20. In the preferred embodiment of the invention, there are four lugs 52 located at uniform distances from the central axis of valve stem 36, two at the upper portion of the valve body and two at the lower portion. Each lug 52 has a threaded longitudinal borehole 54, as shown in FIG. 4. This borehole extends generally through the thickness of the lug. As shown in FIG. 4, the inner diameter of lugs 52 is sized so as to generally define the outer diameter of seat retaining plate 30 and the lugs are axially upset from the remainder of the valve body to locate the seat retainer 30.

When valve assembly 10 is properly aligned between the flanges 12, the flowway 26 is in substantial register with flow passageway 16. Flanges 12 have a plurality of bores 60 extending longitudinally therethrough. Bores 60 are spaced circumferentially about the flanges 12 and each bore 60 on one of the flanges 12 is aligned with a matching bore 60 on the other flange 12. The arrangement of these bores 60 is in accordance with any one of a number of International Flange Standards. A bolt 62 extends through each such pair of matching bores 60 and nuts 64 are placed on the ends of the bolts in order to clamp the valve assembly between the flanges 12. In this invention, it is not essential that bores 60 align with, or match with, the boreholes 54 on lugs 52 of valve body 20.

As shown in FIG. 1, adapter plates 70 and 71 are used to position the valve assembly 10 between flanges 12. Adapter plates 70 and 71 comprise a pair of flat plates having holes therein. Adapter plate 70 is fastened to the lugs 52 located on the valve body 20 on opposite sides of lower boss 24, adapter plate 70 has two longitudinal holes 74 located so as to align with the threaded longitudinal boreholes 54 of the lugs. Holes 74 create a pair of frustoconical voids within plate 70, the largest diameter of this void being at the outer surface of the plate. Adapter plate 70 is fastened to the lugs by inserting flat-headed screws 76 into the frustoconical voids of plate 70 and turning these screws into boreholes 54 of lugs 52. The screws 76 should be turned to such an extent that the head of the screw is recessed into plate 70, i.e. at least flush with the upper surface of flat plate 70.

Adapter plate 71 is fastened to lugs 52 located on valve body 20 on opposite sides of the upper boss 22. This adapter plate 71 has two longitudinal holes 77 located so as to align with the threaded boreholes 54 of the lugs. The configuration of the holes 77 and the method of attaching the adapter plate 71 to the lugs by screws 75 is similar to that stated hereinbefore.

Adapter 70 has an inner edge 78 extending along an arc of the outer diameter of the valve body bounded generally by the two lugs 52 nearest lower boss 24. On opposite ends of this edge 78 are tabs 79. Tabs 79 extend inwardly of inner edge 78 and overlap the outer edge of seat retaining plate 30. The relationship between the tabs 79 and the seat retaining plate 30 is further explained hereinafter. The outer edge 80 extends outwardly from the ends of tabs 79 a distance sufficient to allow for proper placement of holes 82, described below. Adapter 71 has an inner edge 81 extending along an arc of the outer diameter of the valve body defined generally by the two lugs 52 nearest upper boss 22. The tabs and the outer edge of adapter 71 are of similar configuration as corresponding parts of adapter 70.

The adapters 70 and 71 each have another set of longitudinal holes 82 located distal from the valve body 20. These holes 82 correspond to the location of four of the bores 60 on flanges 12. These holes 82 should be of a sufficient diameter to accommodate bolts 62. Holes 82 should be located in a non-interfering position with respect to the upper boss 22 and lower boss 24. In other words, bolts 62 should be free of any obstruction by the valve body. In keeping with the preferred embodiment of this invention, holes 82 are pre-drilled into adapter plates 70 and 71 in accordance with the International Flange Standards. Thus, the location and size of holes 82, as between various different adapters, will vary with the type of flange to which it will be mounted.

Figure 2:
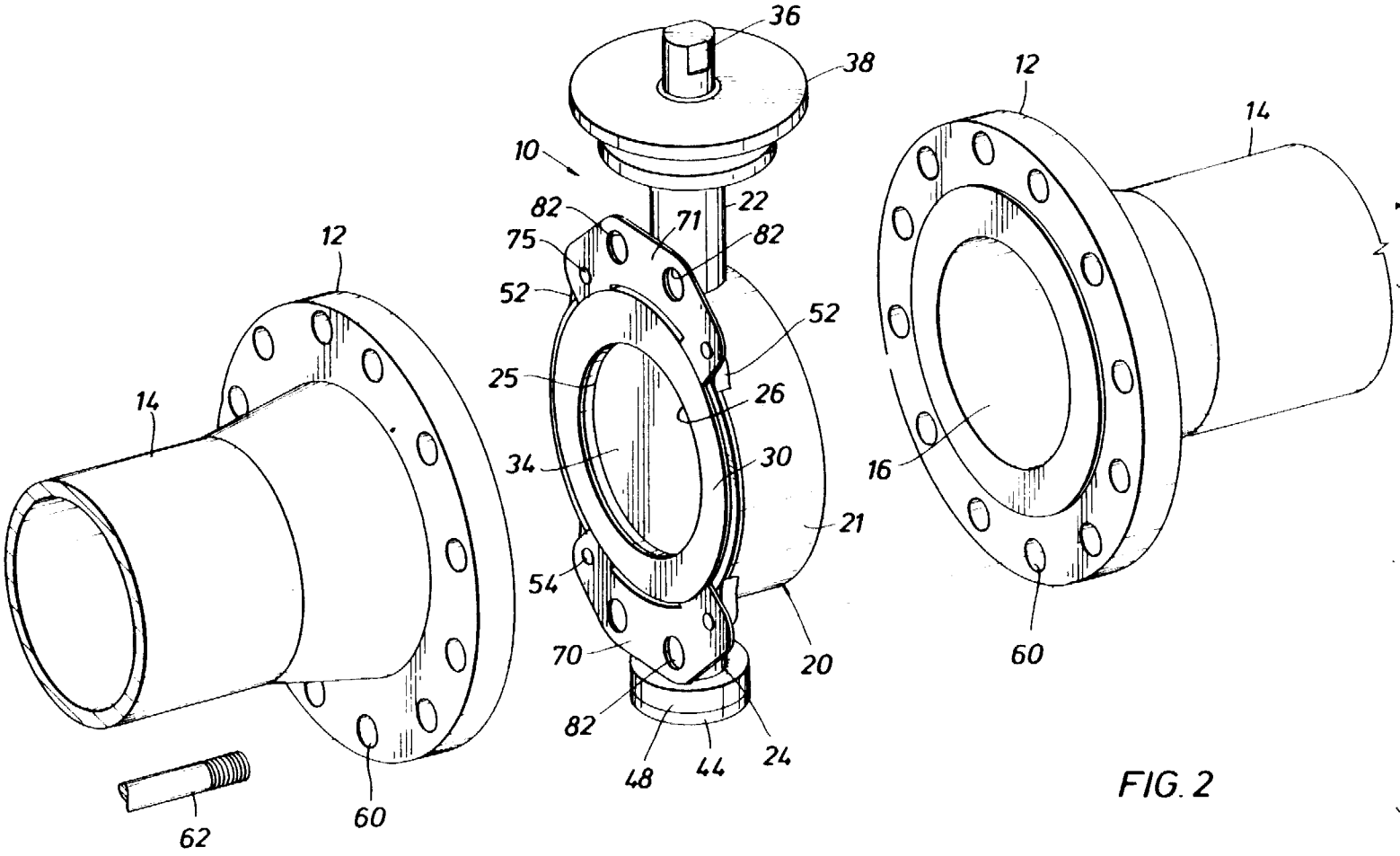
FIG. 2 is an exploded perspective view of the valve assembly of FIG. 1 and flange fittings.

The adapter shown in FIGS. 1-3 is designed for use with the flange fitting also shown in those figures. Thus, when each hole 82 is aligned with a respective one of the bores 60 on each of the flanges 12, the flowway 26 will be in substantial register with the flow passageways 16. Bolts 62 are then placed through each set of aligned adapter holes 82 and bores 60 to perfectly align the valve assembly with the flange fittings and hold the valve in place while the other bolts 62 are placed through the remaining pairs of aligned bores in the flanges 12. Flanges 12 are then clamped tightly together with the valve assembly 10 therebetween by placing a nut 64 on the end of each bolt 62 and tightening the nut 64. The adapter serves to maintain the axial alignment of the flowway 26 of the valve body with the flow passageways 16 of pipes 14.

An important feature of the present embodiment is shown in FIG. 4. This figure shows the relationship of the adapter 70 with respect to the seat retaining plate 30, gasket 31, and valve body 20. Gasket 31 is interposed between the valve body 20 and retaining plate 30. Annular seat retaining plate 30 is axially undercut along its outer diameter as shown at 84. Tabs 79 are received in undercut 84 and overlap the outer diameter of the seat retaining plate 30. The fastening of adapter 70 onto lugs 52 causes seat retaining plate 30 and gasket 31 to be locked into face-to-face position on the valve body. Seat retaining plate 30, being locked in position, serves to maintain valve seat 25 in its proper position. As shown in FIG. 1, seat retaining plate 30 is locked into position about the four lugs 52 on the outer diameter of valve body 20. At the same time, also as shown in FIG. 4, adapter plate 70 and seat retaining plate 30 are sized so that adapter plate 70 does not interfere with proper abutment of the plate 30 with one of the two flanges 12. As previously mentioned, the heads of screws 54 are recessed into adapter 70 so as not to interfere with such abutment.

An alternative use of the valve assembly is shown in FIG. 5. With certain types of flange fittings, the valve body may be centered between the flange fittings by locating abutting surfaces of the valve body adjacent to the flange connecting bolts. In this embodiment, the abutting surfaces are the lugs 52 and the outer diameter of the valve body. These lugs 52 outwardly abut the bolts 85 which extend from flange to flange. As a result, the valve body will be maintained in alignment with the passageways of the flanges. To secure the seat retaining ring 30 to the valve body, a small plate 86 is mounted onto each of the lugs 52. Plate 86 has one edge 88 which is an arc of similar configuration as the outer diameter of the valve body. The outer edge of plate 86 can be of any configuration necessary to abut the bolt 85 or to be contained within the surface area of lug 52. As plate 86 is fastened into proper position on lug 52, edge 88 mates with notch 80 of the seat retaining ring 30. This locks the seat retaining plate in its proper position about seat 25. Gasket 31, interposed between seat ring 30 and valve body 20, is thus held in its proper position therebetween. Small plates such as 86 can similarly be used to secure the seat retaining rings of "full-lug" valve bodies in which the body lugs are used for direct connection to flange fittings without an intermediate adapter plate.

It can be seen that the present invention permits a single wafer-type valve to be used with virtually any suitable flange fitting by simply selecting the appropriate adapter plates. Furthermore, the adapter plate itself is a relatively simple structure, inexpensively manufactured from plate metal. The adapter plate also serves the useful function of locking the seat retaining ring in proper position about the valve seat. This is highly desirable in contrast to those seat retaining rings which require screws and bolt holes to maintain them in proper position, as the structural stability of certain gaskets is greatly diminished where bolt holes must be drilled or located therein. This feature is maintained even in the alternative embodiments of this invention where alignment and/or connection to the flanges is achieved through other means.

While particular embodiments of the present invention and the method of use thereof have been shown and described, it is evident that minor changes may be made therein without departing from the true spirit and scope of the invention. It is the intention in the appended claims to cover all such changes and modifications.

I claim:

1. A wafer-type valve assembly for securing to a flange fitting having a flow passageway therethrough and comprising a flange extending radially from said flow passageway, wherein said valve assembly comprises:

a valve body having a flowway therethrough;

connection formations integrally adjoining said valve body and extending generally radially therefrom;

a valve element mounted in said flowway for movement between a first position closing said flowway and a second position opening said flowway;

adapter means adjoining said valve body and extending outwardly therefrom;

first longitudinally extending connector means cooperative between said connection formation means of said valve body and said adapter means to connect said adapter means to said valve body; and second longitudinally extending connector means cooperative between said adapter means and said flange of said flange fitting to connect said adapter means to said flange fitting.

2. The combination of claim 1 wherein each of said connector means comprises mating pin and socket means.

3. The combination of claim 2 wherein said first connector means comprise a plurality of pairs aligned bores in said connection formations and said adapter means and a plurality of pin members extending into respective pairs of such aligned bores; and wherein said second connector means comprise a plurality of pairs of aligned bores in said adapter means and said flange and a plurality of [lug] *male* members extending through respective pairs of such aligned bores.

4. The combination of claim 2 wherein said adapter means comprises a pair of diametrically opposed adapter plates, each of said adapter plates having associated therewith two such first connector means, circumferentially spaced from each other, and two such second connector means, circumferentially spaced from each other.

5. The combination of claim 4 further comprising an annular valve seat lining said flowway of said valve body and a seat retainer axially abutting said valve seat and one end of said valve body to retain said valve seat in said valve body, said adapter plates axially overlapping said seat retainer to mount said seat retainer to said valve body.

6. The combination of claim 5 wherein said seat retainer is axially undercut to receive said adapter plates, said adapter plates and said seat retainer presenting substantially coplanar surfaces for abutment with one of said flanges of said flange fittings.

7. The combination of claim 6 wherein said adapter plates comprise tab means extending radially inwardly into said undercut of said seat retainer.

8. The combination of claim 6 wherein first connector means comprises screw means for securing said adapter plates to said connection formations of said valve body, the heads of said screws being recessed into said adapter plates so as not to protrude from said coplanar abutment surfaces.

9. The combination of claim 1 wherein said connection formations of said valve body comprise lugs positioned about the outer diameter of said valve body.

10. A wafer-type valve assembly for securing to a flange fitting having a flow passageway therethrough and comprising a flange extending radially from said flow passageway, wherein said vlave assembly comprises:

a valve body having a flowway therethrough;

connection formations integrally adjoining said valve body;

a valve element mounted in said flowway for movement between a first position closing said flowway and a second position opening said flowway;

an annular valve seat lining said flowway for sealing engagement with said valve element;

a seat retainer axially abutting said valve seat and one end of said valve body to locate said valve seat;

adapter means adjoining said valve body and extending outwardly therefrom, said adapter means axially overlapping said seat retainer;

first connector means cooperative between said connection formations of said valve body and said adapter means to connect said adapter means to said valve body and thereby mount said seat retainer to said valve body; and second connector means [cooperative between said adapter means and said flange of said flange fitting to connect] *for connecting* said [adapter means] *valve assembly* to said flange fitting.

11. The combination of claim 10 wherein said seat retainer is axially undercut to receive said adapter means, said adapter means and said seat retainer presenting substantially coplanar surfaces for abutment with one of said flanges of said flange fittings.

12. The combination of claim 11 wherein said adapter means comprises plate means.

13. The combination of claim 12 wherein said undercut of said seat retainer is disposed at the outer diameter of said seat retainer, and wherein said retainer means comprise tab means extending into said undercut.

*14. The combination of claim 10 wherein said first and second connector means are longitudinally oriented.*

*15. The combination of claim 14 wherein said second connector means is cooperative between said adapter means and said flange of said flange fitting.*

*16. The combination of claim 14 wherein said second connector means comprises a plurality of male connector members extending longitudinally along the exterior of said valve body, bypassing said adapter means.*

*17. The combination of claim 10 wherein said connection formations are in the form of a plurality of lugs extending radially outwardly from said valve body, and wherein said adapter means at least partially axially overlie said lugs.*

* * * * *